US012565057B2

(12) United States Patent
Syrjanen et al.

(10) Patent No.: US 12,565,057 B2
(45) Date of Patent: Mar. 3, 2026

(54) SECURITY ELEMENTS IN COVERS OF SECURE ARTICLE BY ULTRASONIC WELDING

(71) Applicant: THALES DIS FRANCE SAS, Meudon (FR)

(72) Inventors: Taru Syrjanen, Vantaa (FI); Kristian Lappalainen, Espoo (FI)

(73) Assignee: THALES DIS FRANCE SAS, Meudon (FR)

( * ) Notice: Subject to any disclaimer, the term of this patent is extended or adjusted under 35 U.S.C. 154(b) by 0 days.

(21) Appl. No.: 18/855,029

(22) PCT Filed: Apr. 7, 2023

(86) PCT No.: PCT/EP2023/059313
§ 371 (c)(1),
(2) Date: Oct. 8, 2024

(87) PCT Pub. No.: WO2023/194605
PCT Pub. Date: Oct. 12, 2023

(65) Prior Publication Data

US 2025/0249700 A1 Aug. 7, 2025

(30) Foreign Application Priority Data

Apr. 8, 2022 (EP) .................................... 22305502

(51) Int. Cl.
*B42D 25/24* (2014.01)
*B42D 25/328* (2014.01)
*B42D 25/333* (2014.01)
*B42D 25/425* (2014.01)

(52) U.S. Cl.
CPC ........... *B42D 25/24* (2014.10); *B42D 25/328* (2014.10); *B42D 25/333* (2014.10); *B42D 25/425* (2014.10)

(58) Field of Classification Search
CPC .... B42D 25/24; B42D 25/328; B42D 25/333; B42D 25/425
USPC ...... 283/67, 70, 72, 74, 75, 77, 94, 98, 107, 283/108, 901
See application file for complete search history.

(56) References Cited

U.S. PATENT DOCUMENTS

2015/0227829 A1* 8/2015 Finn ...................... B42D 15/00 438/118

FOREIGN PATENT DOCUMENTS

DE 102018125516 A1 4/2020
WO 2017177328 A1 10/2017

OTHER PUBLICATIONS

International Search Report (PCT/ISA/210) and Written Opinion (PCT/ISA/237) mailed on May 15, 2023, by the European Patent Office as the International Searching Authority for current International Application No. PCT/EP2023/059313—[11 pages].

* cited by examiner

*Primary Examiner* — Justin V Lewis

(57) ABSTRACT

Provided is a secure article, preferably a multi-page article, comprising a front cover, a reverse cover, and at least one security element. The security element can be provided on, and/or, in the front cover and/or the reverse cover, and can be produced by ultrasonic welding. The security element comprises or consists of an optically variable element. Other embodiments are disclosed.

13 Claims, 5 Drawing Sheets

SECURITY ELEMENTS IN COVERS OF SECURE ARTICLE BY ULTRASONIC WELDING

TECHNICAL FIELD

The present invention relates to a secure article comprising at least one security element according to claim 1 and to a method of producing a secure article according to claim 12.

BACKGROUND

Secure articles such as passports are prone to counterfeiting. In order to increase protection against forgery, it is important to provide the secure article with security elements that make a forgery of the secure article more difficult and recognizable. In this respect, security elements protecting an inside of a secure article such as the datapage or visapage of a passport as well as security elements protecting an outside of the secure article, in fact the front and reverse covers of a secure article such as a passport, exist.

The covers of a secure article such as a passport are an essential part of the durability and security of the entire secure article. For many years, known security elements of covers have been gold foiling, UV fluorescent printing, and blind embossing/debossing.

Blind embossing is a traditional field of industry with the type of equipment that typically have been used for decades. Blind embossing is done using heat and pressure, or pressure only. Engraved tools press the required indicia to the material. There may be one engraved plate and its counterpart is flexible material. This flexible material may be pre-formed to follow the shape of the engraved plate. Alternatively, the male-female counterparts can be both metal. When only heat and pressure are used, the machinery is big, heavy and expensive, and it is nearly impossible to reproduce very fine details (like microtext). If better registration and resolution are required, the costs will further increase significantly. It is worth noticing that the formable material (covers) do not stand extreme heat and pressure values without severe damages. That is, blind embossing is challenging to make in such a way that the embossing is well visible, durable, and the surface remains unharmed. And yet, the embossing is usually of low resolution.

UV fluorescent printing on passport covers is usually made by printing machines, by cover manufacturer. Conventionally, UV fluorescence printing is of low resolution and continuous by nature.

Numbering of passport covers is usually being made by cover perforation, labeling, and letterpress. The location of the numberings, due to the nature of the equipment(s), is rather limited.

Gold foiling is typically being done in 2D format, by flat plates. The main parameters are heat and pressure. The resolution of such security elements is rather low. It is not possible to create microtext by current gold foiling units, or add embossing on top of the pre-made gilding.

Hence, in summary it can be said that existing security elements in covers of a secure article are few and suffer from drawbacks such as low resolution or being associated with complex equipment or high costs.

SUMMARY OF THE INVENTION

It is an object of the present invention to overcome the drawbacks of the prior art. In particular it is an object to provide a secure article that has increased security and is easy to manufacture at the same time.

This object is achieved by the secure article according to claim 1. In particular, a secure article, preferably a multi-page article, is provided. The secure article comprises a front cover, a reverse cover, and at least one security element. The security element is provided on and/or in the front cover and/or the reverse cover. The security element is produced by ultrasonic welding. The security element comprises or consists of an optically variable element.

The secure article preferably is a passport, a bank book, a cheque book, a ticket book or an identification booklet or the like. The secure article can further comprise at least one data carrier, preferably a data page, being provided between the front cover and the reverse cover.

The security element being provided on and/or in the front cover preferably is provided on an outer side of the front cover. Likewise, the security element being provided on and/or in the reverse cover preferably is provided on an outer side of the reverse cover. The outer sides of the front cover and the reverse cover face towards an outside of the secure article. Furthermore, in the event of a secure article being provided as a booklet such as a passport, the front cover and the reverse cover furthermore comprise a spine as it is known in the state of the art. In this regard it should be noted that the security element can likewise be provided on and/or in the spine of the front cover and the reverse cover.

Hence, the present invention is based on the insight that ultrasonic welding can be used to produce security elements on and/or in covers of a secure article. Ultrasonic welding is a simple and fast technology that does not require any extra consumables. In particular, it offers several process advantages such as high process speed and short process cycles, high flexibility due to the modular construction of the equipment, very short maintenance times, consistent and accurate welding results. It is furthermore economical, energy-saving and efficient. Additionally, and as will also be outlined in greater detail further below, the ultrasonic welding enables new dimensions to covers comprising security elements. For instance, an embossing or debossing of textile covers is rendered possible too, not only of paper covers. Ultrasonic welding enables fine details such as microtext in embossings or debossings and furthermore enables the generation of various completely new features such as optically variable element, and notably latent images or diffractive elements, which have not been known from covers so far. Furthermore, depending on the tooling being used, the security elements can be personalized. Additionally, the generation of the security elements can be done at various stages such as in the covers before they are connected to the finished secure article but also in the finished secure article such as in the finished passport booklet. Moreover, and as already mentioned, various areas of the covers such as the spine can be provided with a security element.

Ultrasonic welding is well-known in the art and corresponds to a process that uses mechanical vibrations in the ultrasonic range. These vibrations, produced by a welding sonotrode, as it is generally known, are used to act on at least part of the front cover and/or the reverse cover, whereby the security element is produced. To this end it is furthermore preferred that the front cover and/or the reverse cover is placed on an anvil as it is known in the art as well, and wherein the sonotrode is pressed onto the front cover and/or the reverse cover on a side being opposite the anvil. The ultrasonic welding is preferably performed using an ultrasonic welding device as it is known in the art. The ultrasonic welding device is preferably commercially available.

The security element preferably comprises or consists of at least one embossing and/or at least one debossing and/or at least one deformation and/or at least one melted area.

An embossing is understood as an element comprising protrusions and/or recesses, which extend away from the front cover and/or the reverse cover. In other words, the security element in the form of the embossing preferably has a raised appearance. A debossing is understood as an element comprising protrusions and/or recesses, which extend towards or into the front cover and/or the reverse cover. In other words, the security element in the form of a debossing preferably has a sunken appearance.

Moreover, depending on an energy level at which the ultrasonic welding is performed and/or the tooling of the ultrasonic welding device, one or more melted areas and/or one or more deformations can be generated, whereby the security element is formed as well. That is, the ultrasonic welding can melt or deform a material the front cover or the reverse cover are made of, for instance. In fact, by «deformation» it is meant that at least part of the material is locally deformed by losing its normal shape and/or width. Furthermore, it should be noted that a deformation and/or the generation of a melted area is possible without embossing or debossing. Additionally, it should be noted that the melted area is in the solid state.

An advantage of the secure article according to the invention is that the security element produced by ultrasonic welding comprises or consists of an optically variable element. An optically variable element is an element the optical properties of which can change in dependence of some factors, notably optical factors. Optical properties can be color, transparency, or any other characteristic that can be observed by bare eyes or using a measuring device. Optical factor can be lighting, observation angle, etc. It has to be noted that an embossing or a debossing alone shouldn't be considered as an optically variable element only because the position of the created shades vary depending on the lightning orientation. Optically variable features are typically designed to create a more noticeable change in appearance when viewed from different angles or under different lighting conditions. Optically variable features can notably use specialized materials, such as holographic films or color-shifting inks, to create a range of optical effects that are difficult to reproduce using standard printing techniques. In contrast, the shadows created by an embossing or a debossing with no particular dimensions are a result of the physical properties of the material being stamped, rather than a deliberate optical effect. As previously mentioned, the use of ultrasonic welding enables to produce security element with very fine details, notably because it allows to precisely control the deformation of a structure. Thus, the formation of optically variable element as security element with use of ultrasonic welding is particularly advantageous. Indeed, the precise control of the relief of a material is a critical parameter for forming security features such as optically variable element on said material. For example, some optical variable element produced on secure article cover are induced by controlled reflection of light based on dedicated micro-patterning of the surface of said cover. Furthermore, producing an optically variable element such as a diffractive element requires precise control of the deformation of the structure on which said security element is produced and said deformation should be small enough to be in a light wavelength range in order to produce the diffractive effect. As the use of ultrasonic welding enables to produce security element with very fine details and very small size range by precisely controlling the deformation of a structure, very high quality diffractive element can be produced on said structure. Moreover, compared to known techniques for forming optically variable elements, it allows more options in terms of process steps, much lower pressures, and hence less physical damage on the cover. Furthermore, the ultrasonic welding device is much smaller than the other known equipment for forming optically variable element.

Advantageously, the security element can exhibit an appearance that is configured to change in dependence of an illumination direction along which the security element is illuminated. That is, the security element can be an optical element such as a so-called latent element. Additionally or alternatively, the security element can exhibit an appearance that is configured to change in dependence of an observation direction along which an observer observes the security element. That is, the security element can be an optical element such as a diffractive element. Additionally or alternatively, the security element can be watermark like. Additionally or alternatively, the security element can be at least regionally fluorescent.

As mentioned earlier, the fluorescence of the security element and/or the capability of changing its appearance in dependence of at least one of an illumination direction and observation direction and/or being configured to diffract impinging electromagnetic radiation and/or exhibiting a water-mark like appearance is produced by the ultrasonic welding treatment of the secure article. Furthermore, the embossing and/or debossing and/or deformation and/or melted area are preferably produced by the ultrasonic welding treatment of the secure article.

Within the context of the present invention, the expression "watermark like" refers to an at least partial translucency. Said at least partial translucency is preferably produced during the ultrasonic welding treatment of the secure article and particularly preferably corresponds to a change in material thickness, local density and hence change in opacity and light diffusion.

The embossing and/or debossing and/or deformation and/or melted area can at least regionally exhibit the fluorescence. Additionally or alternatively the embossing and/or debossing and/or deformation and/or melted area can at least regionally generate a diffraction of impinging electromagnetic radiation. Additionally or alternatively the embossing and/or debossing and/or deformation and/or melted area can at least regionally generate a changing appearance in dependence of the illumination direction along which the security element is illuminated. Additionally or alternatively the embossing and/or debossing and/or deformation and/or melted area can at least regionally generate a changing appearance in dependence of the observation direction along which the observer observes the security element. Additionally or alternatively the embossing and/or debossing and/or deformation and/or melted area can at least regionally generate a water-mark like appearance.

For instance, the security element in the form of the latent element could be embossed or debossed, and it could be fluorescent. The security element in the form of the diffractive element could be embossed or debossed, but not fluorescent. The watermark-like element could be embossed or debossed, and it could be fluorescent. Furthermore, the watermark-like security element could be embossed or debossed feature, and it could be fluorescent.

Moreover, the optical effect of the optically variable element, such as the fluorescence and/or a diffractive appearance, i.e. the appearance being generated by the diffractive element, and/or the changing appearance that changes in dependence of the illumination direction or the observation direction of the security element, and the embossing and/or the debossing and/or the deformation and/or the melted area are in registration with one another. In other words, in the case where the security element corresponds to an embossed or debossed element, the optical effect of the optically variable element is a consequence of the embossing and/or debossing, wherein they are automatically in perfect registration with the original embossing and/or debossing.

As mentioned earlier, the security element can correspond to an optical element such as for example a diffractive element or a latent element. Hence, the security element preferably comprises at least one diffractive structure that is configured to diffract impinging electromagnetic radiation, the diffractive structure preferably being formed by a surface of the security element and/or being a periodic structure. Additionally or alternatively, the security element preferably comprises at least a first surface structure being formed by a surface of the security element and a second surface structure being formed by the surface of the security element, and wherein the first surface structure and the second surface structure are arranged at an angle with respect to one another.

A dimension of the diffractive structure or of the surface structures depend on the tooling being used in the ultrasonic welding process. The dimension can be in the nanoscale range, but more preferably is in the microscale range such as 0.25 millimeter, for instance. The first surface structure and the second surface structure can be arranged at any angle with respect to one another, such as 90°.

The diffractive structures and/or at least one of the surface structures preferably comprises or consists of slit or lines. Two adjacent slits present a distance d between each other, said distance d being comprised between 2 μm and 25 μm. Each slit presents a depth or height h, said depth or height h being comprised between 0.25 μm and 1 μm. Preferably, distance d is comprised between 6 μm and 20 μm, and depth or height h is comprised between 0.3 μm and 0.85 μm. More preferably, distance d is comprised between 10 μm and 15 μm, and depth or height h is comprised between 0.4 μm and 0.7 μm. Those dimensions allow diffracting impinging electromagnetic radiation and therefore giving raise to the diffractive effect. Those dimensions, and by consequence this diffractive effect, is not possible to obtain with other known technique for marking a cover of a secure article.

The front cover and/or the reverse cover can comprise one or more textiles and/or one or more fabrics and/or one or more paper-based compounds and/or one or more cardboard-based compounds and/or one or more plastics and/or one or more polymers.

The front cover and/or the reverse cover preferably comprise one or more layers of at least one of a textile, a fabric, a paper-based compound, a cardboard-based compound, a plastic, or a polymer.

The front cover and/or the reverse cover can be solid, i.e. without any openings or the like but being of a continuous shape, such as continuous one or more layers.

The fabric and/or the textile can comprise yarns and/or threads and/or filaments. The yarns and/or threads in turn preferably comprise or consist of one or more fibres. The fibres can be natural or synthetic fibres. Examples of synthetic fibres are fibres made of one or more polymers and/or one or more plastics.

The front cover and/or the reverse cover particularly preferably are paper-based covers or textile-based covers. A paper-based front cover or reverse cover comprises a paper base that has been saturated with a polymer dispersion and that has a protective coating on top. The composition of the paper base may vary. A textile-based front cover or reverse cover comprises a textile base has been saturated with a polymer dispersion and that has a protective coating on top. The composition of the textile base may vary as well.

The front cover preferably defines a surface, and wherein the security element is at least partially provided in said surface. Additionally or alternatively, the reverse cover preferably defines a surface, and wherein the security element is at least partially provided in said surface. In this case, the security element is said to be provided in the front cover and the reverse cover, respectively. Furthermore, in this case the security element being an embossing or a debossing is understood as comprising protrusions and/or recesses, which extend away from the surface of the front cover and the reverse cover, respectively. Likewise, the debossing is understood as comprising protrusions and/or recesses, which extend into the surface of the front cover and the reverse cover, respectively.

The front cover and/or the reverse cover can comprise at least one coating element, and wherein the security element is at least partially provided in the coating element.

That is, the coating element comprising at least part of the security element preferably comprises or consists of at least one embossing and/or at least one debossing and/or at least one deformation and/or at least one melted area as a consequence of the ultrasonic welding process as mentioned above. Furthermore, the coating element preferably in the region of the security element exhibits an appearance that is configured to change in dependence of an illumination direction along which the security element is illuminated and/or that is configured to change in dependence of an observation direction along which an observer observes the security element.

To this end, the coating element can be provided at least partially on the front cover and/or the reverse cover, preferably at least partially on the surface of the front cover and/or on the surface of the reverse cover mentioned above. Furthermore, the security element can at least partially be provided in the coating element and at least partially in the front cover and/or at least partially in the reverse cover. However, it is likewise conceivable that the security element is entirely provided in the coating element, wherein the front cover and/or the reverse cover lack the security element. In the former case, the security element is said to be provided on as well as in the front cover and on as well as in the reverse cover, respectively. In the latter case, the security element is said to be provided on the front cover and on the reverse cover, respectively.

Moreover, in the former case, a part of the security element being provided in the coating element and a part of the security element being provided in the front cover and/or the reverse cover are preferably aligned or registered or congruent with one another. For instance, if the security element corresponds to a debossing, it is preferred that said debossing extends from the coating element at least partially into the front cover and/or the reverse cover.

The coating element preferably comprises one or more plastics and/or one or more polymers and/or one or more pigments and/or one or more metallic compounds such as aluminium and/or one or more inks.

The one or more metallic compounds can be provided as one or more layers or as pigments. For instance, metallic compounds in the form of metallic pigments could be embedded in one or more polymer layers and/or plastic layers. The one or more inks are preferably provided as one or more pigments. The pigments preferably are colour pigments. The pigments are preferably embedded in one or more polymer layers and/or plastic layers.

The coating element particularly preferably corresponds to a so-called foiling such as a gold foiling. At least before its application on the front cover and/or the reverse cover, the coating element preferably furthermore corresponds to a hot stamping foil as it is known in the art. That is, it preferably comprises a so-called carrier film, a release layer, a coloured layer and/or a metallic layer, and a backing for adhesion. The carrier film preferably comprises or consists of one or more polymers such as polyester. The coloured layer preferably comprises colour pigments. The metallic layer preferably corresponds to an aluminium metallization. As will be explained in greater detail further below, the security element can be at least partially generated in the coating element in two different manners. For instance, the coating element can be applied on the front cover and/or the reverse cover by attaching the coating element on the front cover and/or the reverse cover in a first step by means of hot stamping or the like, and to ultrasonically treat the coating element subsequently in a second step. In this case, the coating element when being a foiling such as a gold foiling preferably comprises the coloured layer and/or the metallic layer and the adhesive layer. Alternatively, the coating element could be applied on the front cover and/or the reverse cover during the ultrasonic treatment only. In this case, the coating element preferably comprises all components of the coating element in its untreated state, in particular the carrier film, the release layer, the coloured layer and/or the metallic layer, and the backing for adhesion as mentioned above. That is, in this latter case the entire foiling product is included in the process.

The security element preferably is an integral component of the front cover and/or of the reverse cover and/or of the coating element.

That is, the security element is preferably formed in the material(s) constituting the front cover, the reverse cover, and the coating element, respectively. In other words, the security element is preferably not an additional component being added to the front cover, the reverse cover, and the coating element, respectively.

The secure article preferably further comprising at least one additional security element being produced by ultrasonic welding, and wherein the additional security element is at least partially produced on and/or in the security element.

The additional security element preferably comprises at least one embossing and/or at least one debossing and/or at least one melted area and/or at least one deformation. Generally speaking, the additional security element can be seen as a security element in the security element. Consequently, the additional security element have smaller dimensions than the security element. The use of ultrasonic welding for forming such additional security element is particularly advantageous as ultrasonic welding allows forming security element with very small dimensions and details.

The security element and/or the additional security element preferably have the shape of an image and/or of an alphanumeric character. Non-exhaustive examples of an image are a state coat of arms, a state flag, geometric objects such as lines, circles, etc. Non-exhaustive examples of an alphanumeric character are a date of birth, a name, a social security number e.g. of the holder of the secure article, an expiry date, etc.

The security element and the additional security element can be the same or different from one another. For instance, the security element as well as the additional security element could both be a state coat of arms. Or, as another example, the security element could be a state coat of arms and the additional security element could be a text, etc.

A size of the additional security element is preferably smaller than a size of the security element. For instance, the additional security element could be a microtext that is provided within the security element in the form of the state coat of arms. To this end, and as already mentioned, it is preferred that the additional security element is provided as an embossing and/or debossing on a surface of the security element by ultrasonic welding, and which surface preferably corresponds to one or more melted areas of the security elements that are generated by ultrasonic welding as well.

The additional security element preferably is an integral component of the security element and/or of the front cover and/or the reverse cover and/or the connection device and/or the coating element.

Hence, the additional security element is preferably formed in the front cover and/or the reverse cover and/or the coating element and/or the security element itself. Consequently, it is preferred that the additional security element comprises or consists of one or more materials the front cover and/or the reverse cover and/or the coating element are made of.

It should be noted that the secure article can comprise further security elements and/or personalization elements as they are known in the art. For example, a security element or a personalization element in the form of a printing such as a printed image of a holder of the secure article could be provided on the front cover and/or the reverse cover and/or the coating element. Said printing could be applied to the secure article before the production of the security element according to the invention, and wherein the security element according to the invention is produced subsequently in the region of the printing. In this case, the security element being produced by ultrasonic welding will be provided in the printing. In the event that the security element according to the invention is provided in the printing only, it is understood to be arranged on the front cover, on the reverse cover, and on the coating element, respectively. If the security element is also produced in the front cover, the reverse cover, and in the coating element, it is understood to be arranged on as well as in the front cover, the reverse cover, and the coating element, respectively.

In a further aspect, a method of producing a secure article, preferably a secure article as described above, is provided. The method comprises the steps of i) providing a front cover, ii) providing a reverse cover, and iii) providing at least one security element. The security element is provided on and/or in the front cover and/or the reverse cover. The security element is produced by ultrasonic welding. The security element comprises or consists of an optically variable element.

Any explanations made with regard to the secure article per se likewise apply to the method of producing the secure article and vice versa.

The ultrasonic welding is preferably performed using an ultrasonic welding device as it is known in the art. Hence, the method preferably further comprises the step of providing at least one ultrasonic welding device. Said ultrasonic welding device preferably comprises a sonotrode and/or an anvil.

It is furthermore preferred that the sonotrode and/or the anvil comprises a structure to be embossed and/or debossed into the front cover and/or the reverse cover and/or the coating element, whereby the security element is generated.

It is particularly preferred to use a commercially available ultrasonic welding device, wherein it is furthermore preferred that said ultrasonic welding device is operated with standard settings. In fact, the security element is preferably produced by applying vibrations. The security element is preferably produced by applying vibrations having a frequency in the range of 1 kHz to 100 kHz, preferably in the range of 20 kHz to 70 KHz.

Additionally or alternatively the security element is preferably produced by applying vibrations having an amplitude in the range of 1 micrometer to 100 micrometer, preferably in the range of 5 micrometer to 50 micrometer.

Additionally or alternatively the security element is preferably produced during a welding time in the range of 0.05 second to 1 second, preferably in the range of 0.1 second to 0.5 second.

The security element can be produced before or after the front cover and the reverse cover are assembled so as to form the secure article. That is, it is conceivable that the security element is produced on and/or in the front cover and/or the reverse cover when these components are individual components. Alternatively, it is conceivable that these components are connected to one another so as to form the secure article, and to thereafter produce the security element on and/or in the front cover and/or the reverse cover of the finished secure article.

The method preferably further comprises the step of providing at least one coating element on the front cover and/or the reverse cover and producing the security element at least partially in the coating element.

As mentioned earlier, it is conceivable to apply the coating element in a first step, and to thereafter produce the security element in a second step. However, it is likewise conceivable to apply the coating element and to produce the security element simultaneously. For instance, in the event that the coating element is a foiling such as a gold foiling mentioned above, there are two alternatives: either make the foiling in a traditional way by hot stamping first on the cover(s), then produce the security element by ultrasonic welding fully or partially on top of the foiling. Alternatively, ultrasonic welding can be used to attach the foiling and to generate the embossing and/or debossing on the cover(s) simultaneously. In the event that the ultrasonic welding is used for the foiling process, the size and shape of the gilded element follows the size and shape of the ultrasonic welding tool.

The method preferably further comprises the step of producing at least one additional security element by ultrasonic welding, the additional security element being at least partially produced on and/or in the security element.

The settings of the ultrasonic welding device used to produce the additional security element preferably correspond to the settings being used to produce the security element. Moreover, the security element and the additional security element are preferably generated simultaneously and/or with a common sonotrode and/or a common anvil.

Hence, the present invention enables a high definition surface marking of several different types with low energy consumption, such as detailed, high resolution blind embossings and/or debossings, e. g. microtext, fluorescent security elements being furthermore in registration with the embossings and/or debossings, a latent security element, a diffractive security element, a surface marking of paper covers and textile covers, a removal or modification of the surface finishing of the cover(s) by locally embossing and/or debossing and thereby creating new visual features by the creation of smooth areas. It furthermore provides an alternative technology to make foilings such as gold foilings on passport covers. It also allows the addition of detailed embossings and/or debossings on existing gold foilings, etc.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DETAILED DESCRIPTION

Figure 1:
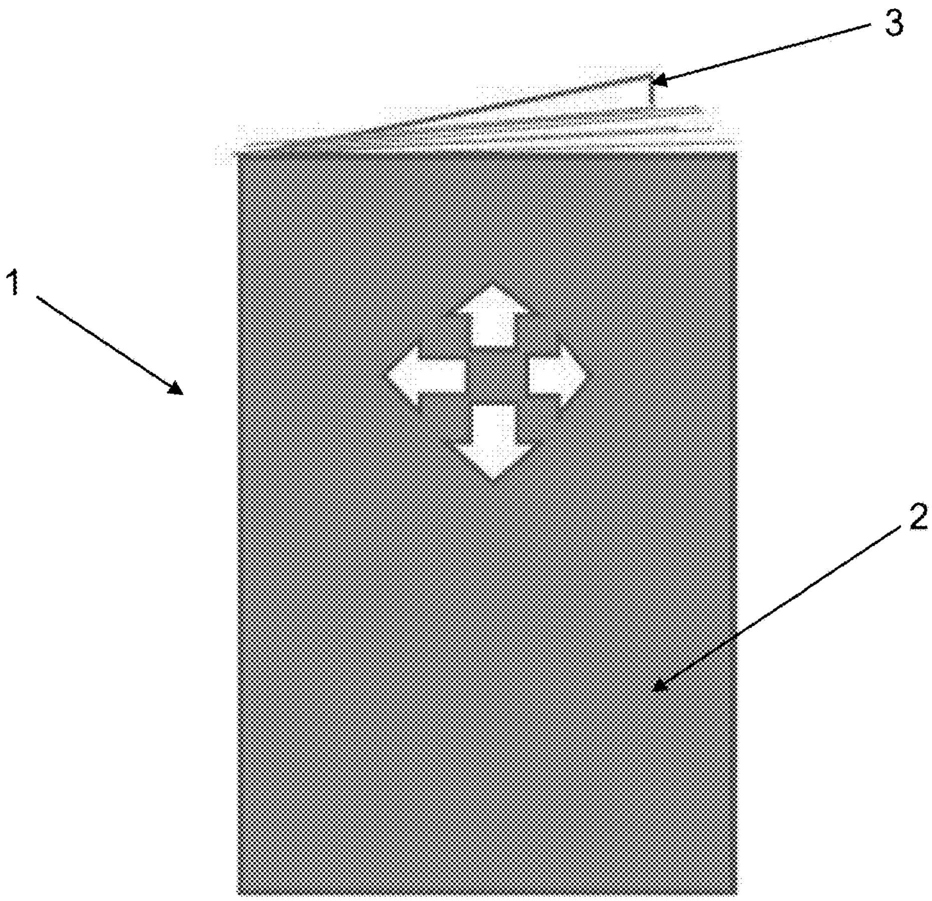
FIG. 1 shows a perspective view of a secure article comprising a front cover and a reverse cover, wherein the front cover comprises a security element.

Aspects of the secure article according to the invention shall now be explained in greater detail with respect to the figures.

As follows from the schematic FIGS. 1 to 5, the secure article 1 according to the invention corresponds to a multipage article such as a passport comprising a front cover 2 and a reverse cover 3, within which several pages such as a visa page and datapages are arranged. The front cover 2 and the reverse cover 3 are connected to one another via a hinge and furthermore comprise a spine. In addition, at least one of the covers 2, 3 in each case comprise at least one security element 10. Said security element 10 is produced by ultrasonic welding.

Figure 2:
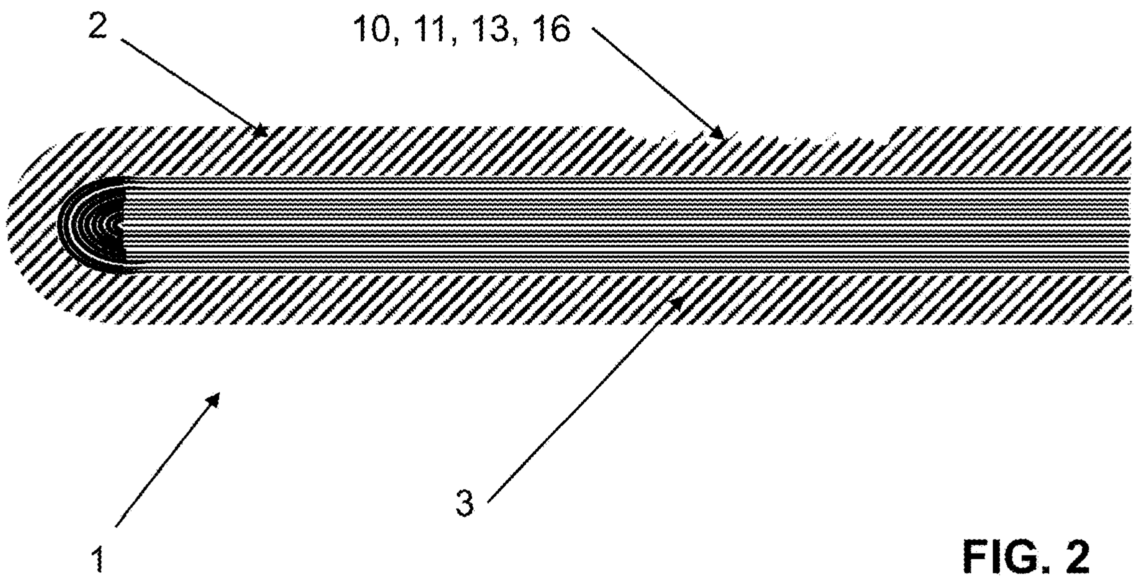
FIG. 2 shows a side view of another secure article comprising a front cover and a reverse cover, wherein the front cover comprises a security element.

In fact, FIG. 2 depicts a security element 10 being generated in the front cover 2, in particular in a surface of the front cover 2. Here, the security element 10 corresponds to a debossing 13 consisting of recesses that extend into the surface of the front cover 2. More particularly, the security element 10 consists of an optically variable element 11 forming a watermark 16.

Figure 3:
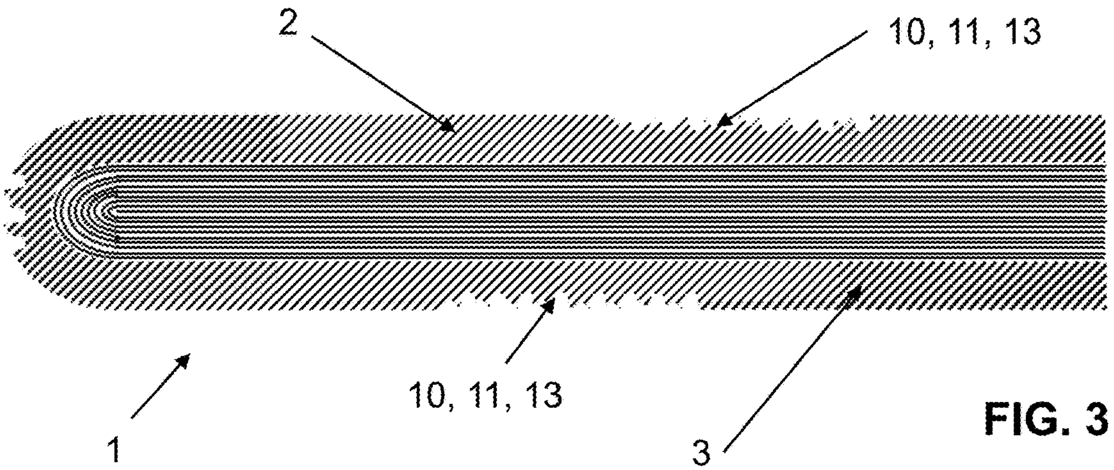
FIG. 3 shows a side view of another secure article comprising a front cover and a reverse cover, wherein the front cover, the reverse cover and their spine in each case comprise a security element.
Figure 4:
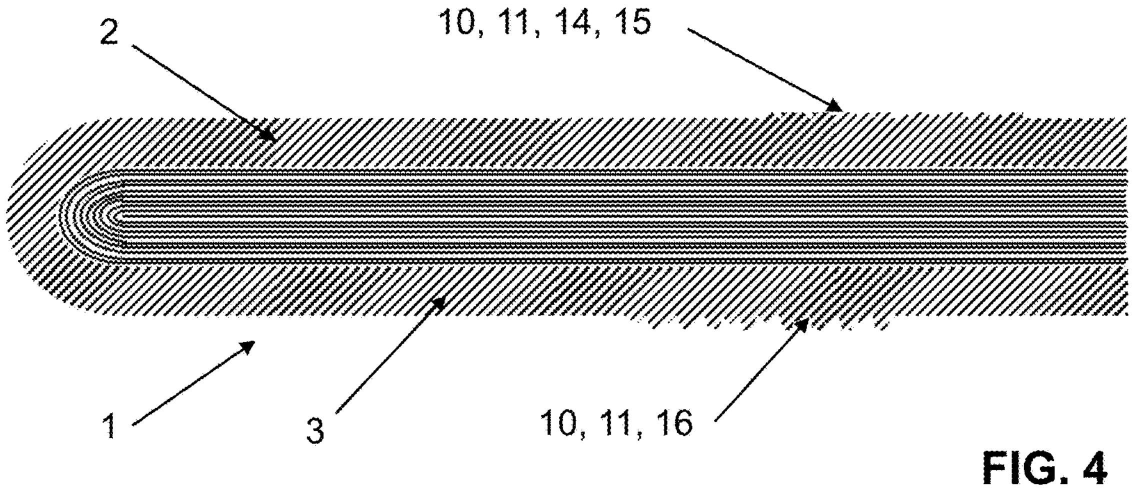
FIG. 4 shows a side view of another secure article comprising a front cover and a reverse cover comprising security elements.

FIG. 3 depicts a secure article comprising three security elements, namely a first security element 10 being produced in the front cover 2, a second security element 10 being produced in the reverse cover 3, and a third security element 10 being produced in the spine of the covers. All security elements 10 correspond to a debossing 13 that in each case extends into a surface of the front cover, a surface of the reverse cover, and a surface of the spine, respectively. All security element 10 consists of an optically variable element 11. FIG. 4 depicts a secure article 1 comprising two security elements 10, namely a first security element 10 being produced in the front cover 2 and a second security element 10 being produced in the reverse cover 3. In the depicted example, the first security elements 10 correspond to an optically variable element 11 and more particularly a diffractive element 14 that extend from a surface of the front cover 2 towards an outside. The second security element 10 correspond to an optically variable element 11 and more particularly a watermark like 16 that extends from a surface of the reverse cover 3 towards an outside, respectively. No matter is added on the front cover 2 nor on the reverse cover 3. As represented on FIG. 4, the dimensions of the deformation of the surface, i.e. the height and depth of the deformations, at the level of the diffractive element 14 is smaller than the deformations at the level of the watermark like 16.

Figure 5:
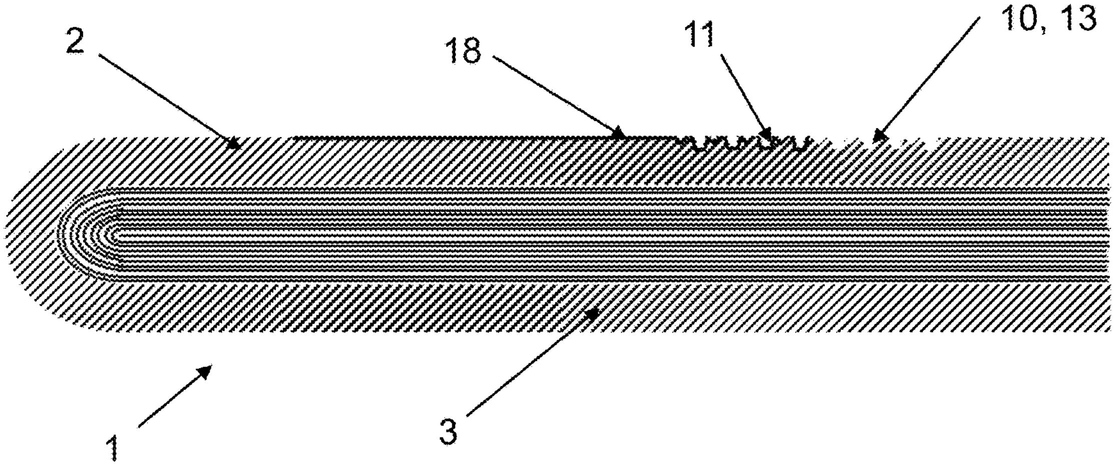
FIG. 5 shows a side view of another secure article comprising a front cover, a reverse cover, and a coating element being arranged on the front cover, wherein the front cover comprises a security element.

FIG. 5 depicts a secure article 1 comprising a coating element 18 being arranged on the surface of the front cover 2. The security elements 10 comprises a debossing 13 that extends into a surface of the front cover 2. The front cover 2 also comprises a coating element 18, said coating element 18 being arranged on a surface of the front cover 2. The security element 10 here is partially provided in the coating element 18 and forms an optically variable element 11 at the level of said coating element 18. The coating element can comprise one or more plastics and/or one or more polymers and/or one or more pigments and/or one or more metallic compounds such as aluminium and/or one or more inks.

Figure 6:
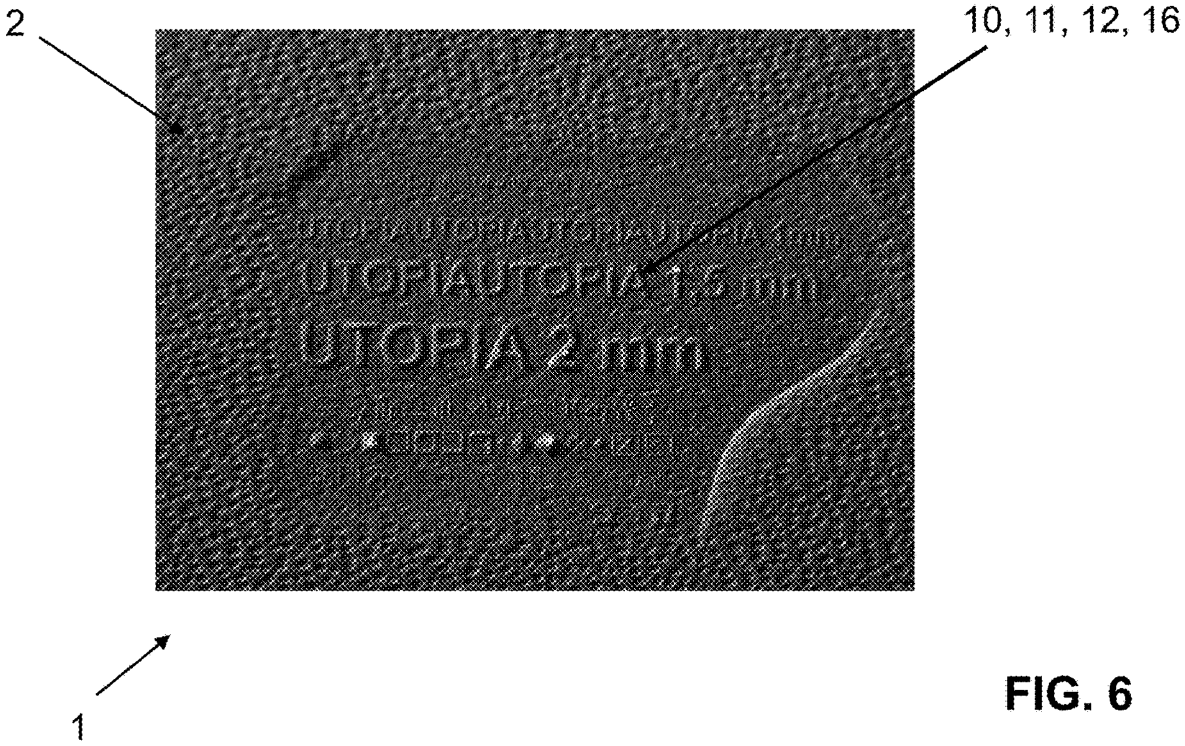
FIG. 6 shows a photograph of a section of a secure article comprising a security element in the front cover, wherein the security element is an embossing.

FIG. 6 shows a photograph of a portion of a secure article 1 comprising a security element 10 in the front cover 2, wherein the security element 10 is an embossing 12. More particularly, the security element 10 consists of an optically variable element 11 forming a watermark like 16. In this case, the front cover 2 is a paper-based front cover. This photograph corresponds to a secure article 1 as illustrated at FIG. 2. The letters "UTOPIA" can be seen on this figure with numbers indication the actual size of the security element 10. The use of ultrasonic welding is particularly advantageous as it allows forming security element 10 with very small details.

Figure 7A:
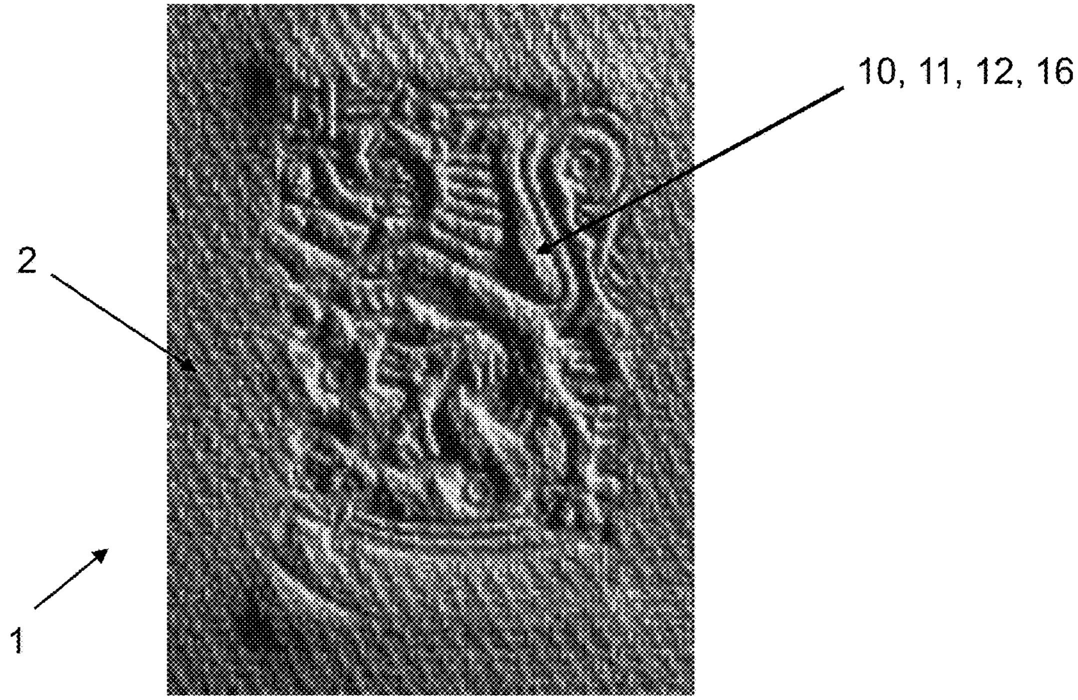
FIG. 7*a* shows a photograph of a section of another secure article comprising a front cover with a security element, wherein the security element is an embossing.

FIG. 7*a* shows a photograph of a portion of another secure article 1 comprising a front cover 2 with a security element 10, wherein the security element 10 is an embossing 12. More particularly, the security element 10 consists of an optically variable element 11 forming a watermark like 16. In this case, the front cover is a synthetic textile cover. The synthetic textile cover comprises synthetic fibers made of one or more polymers and/or one or more plastics.

Figure 7B:
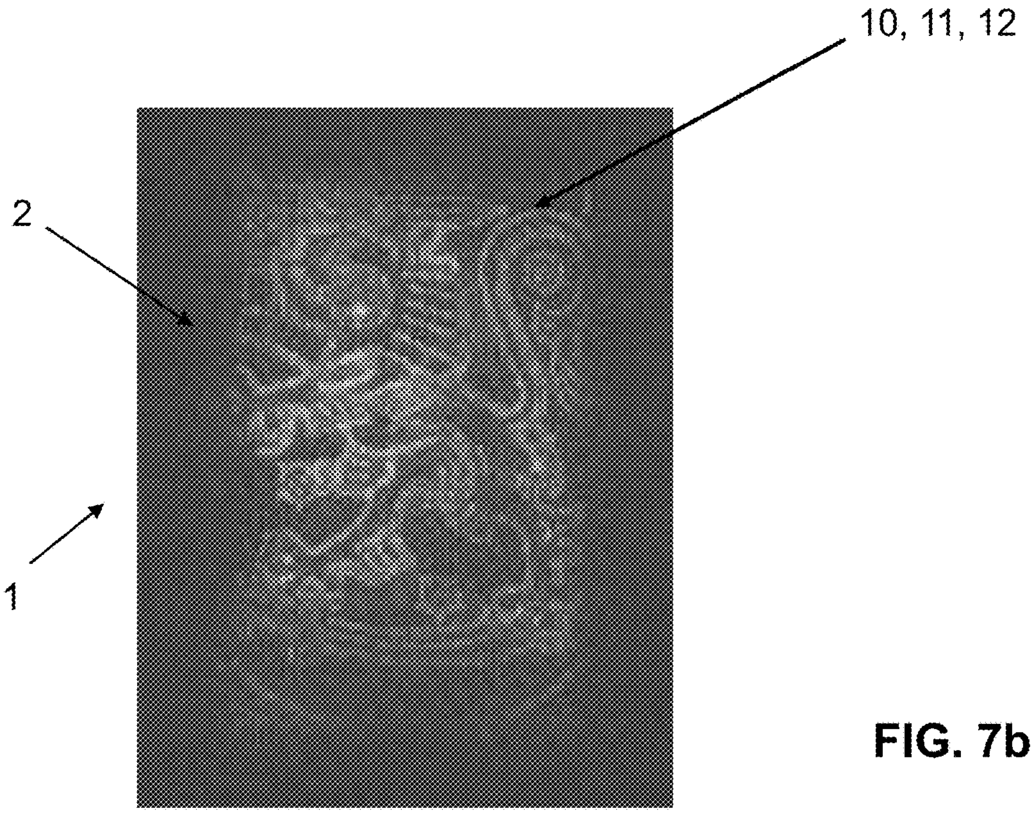
FIG. 7*b* shows a photograph of a section of the secure article according to FIG. 7*a* when illuminated with UV light, wherein the security element exhibits fluorescence.

FIG. 7*b* shows a photograph of a section of the secure article 1 according to FIG. 7*a* when illuminated with UV light. As for FIG. 7*a*, this secure article 1 comprises a front cover 2 with a security element 10, wherein the security element 10 is an embossing 12. More particularly, the security element 10 consists of an optically variable element 11 exhibiting fluorescence. In this case, the front cover 2 is a synthetic textile cover. The synthetic textile cover comprises synthetic fibers made of one or more polymers and/or one or more plastics.

Figure 8:
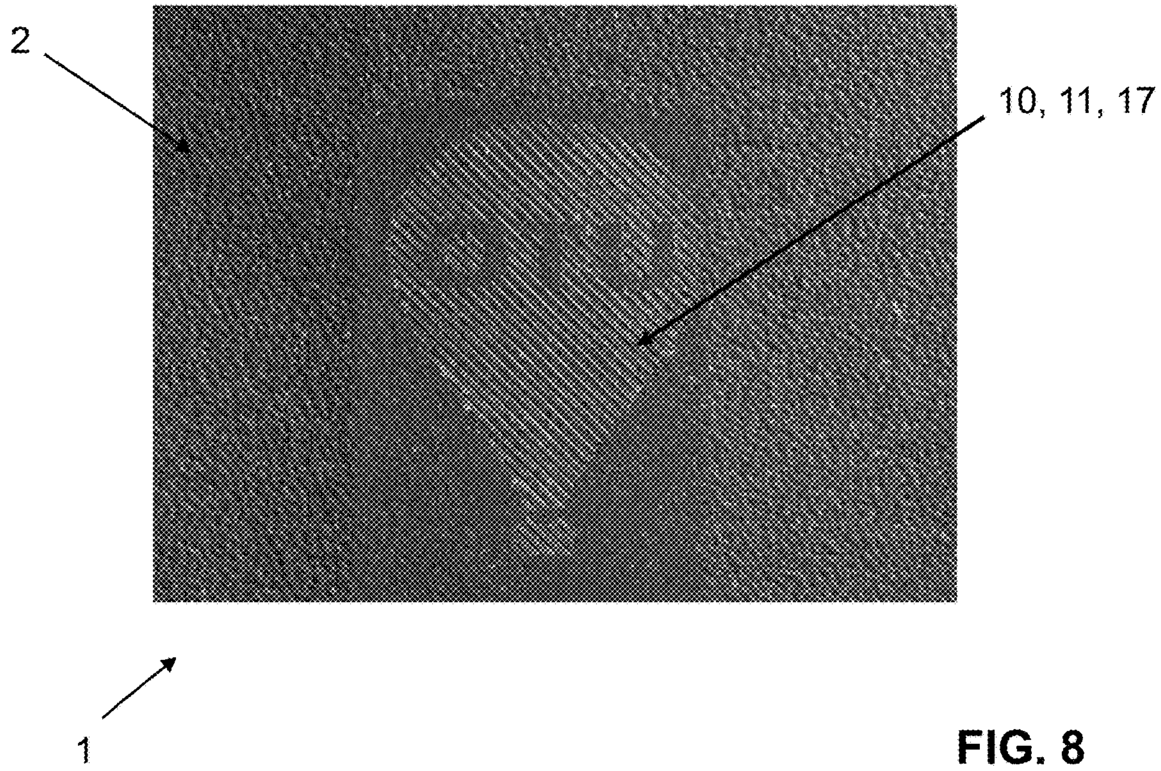
FIG. 8 shows a photograph of a section of another secure article comprising a front cover with a security element.

FIG. 8 shows a photograph of a portion of another secure article comprising a front cover 2 with a security element 10, wherein the security element 10 consists of an optically variable element 11 and comprises a latent element 17. The latent element 17 or latent image is formed here by a pattern of parallel lines. The appearance of the latent image is configured to change in dependence of an illumination direction along which the security element 10 is illuminated and/or in dependence of an observation direction along which an observer observes the security element 10. In this case, the front cover is a paper cover.

Figure 9:
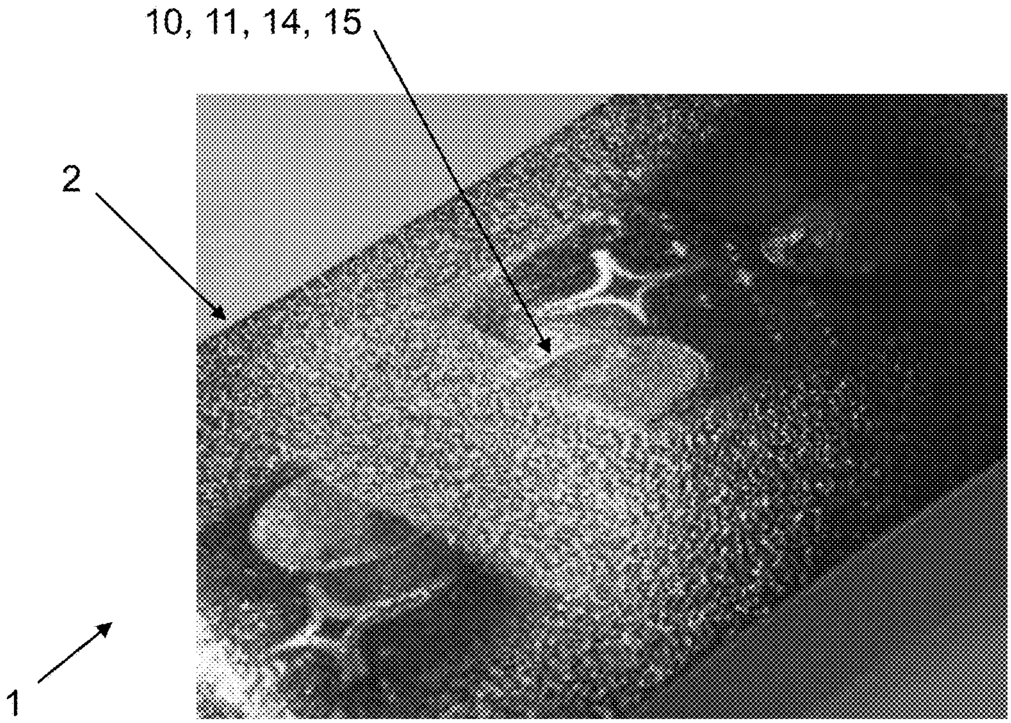
FIG. 9 shows a photograph of a section of another secure article comprising a front cover with a security element.

FIG. 9 shows a photograph of a portion of another secure article 1 comprising a front cover 2 with a security element 10, wherein the security element 10 consists of an optically variable element 11 which is a diffractive element 14. Said diffractive element 14 presents a diffractive structure 15 at the surface of the security element 10. Said diffractive element 14 at least regionally generates a diffraction of impinging electromagnetic radiation and generates a changing appearance in dependence of the illumination direction along which the security element 10 is illuminated and/or in dependence of the observation direction along which the observer observes the security element 10. In this case, the front cover is a paper cover. This photograph corresponds to a secure article 1 as illustrated at FIG. 4.

Figure 10:
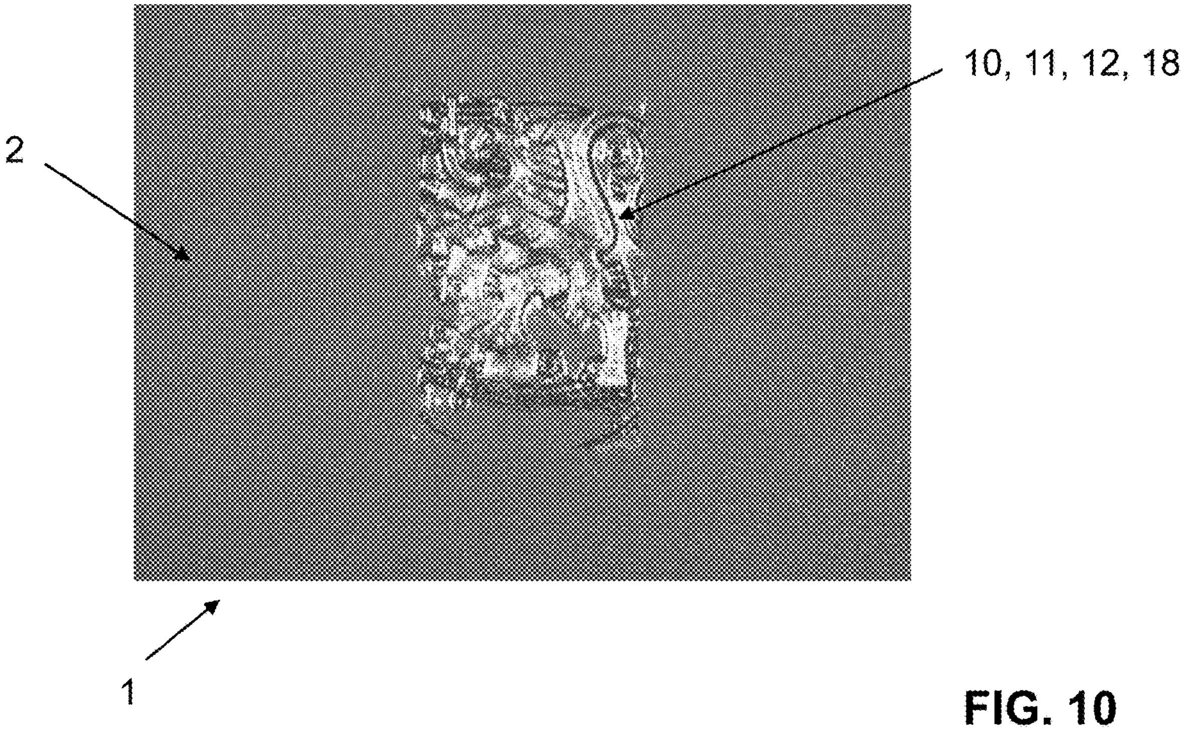
FIG. 10 shows a photograph of a section of another secure article comprising a front cover with a security element.

FIG. 10 shows a photograph of a portion of a secure article 1 comprising a security element 10 in the front cover 2, wherein the security element 10 is an embossing 12. More particularly, the front cover 12 comprises a coating element 18, the security element 10 being at least partially provided in the coating element 18 and therefore forming an optically variable element 11. In this case, the front cover 2 is a paper-based front cover and the coating element 18 is a gold foil. This photograph corresponds to a secure article 1 as illustrated at FIG. 5.

LIST OF REFERENCE SIGNS

1 secure article
2 front cover
3 reverse cover
10 security element
11 optically variable element
12 embossing
13 debossing
14 diffractive element
15 diffractive structure
16 watermark like
17 latent element
18 coating element
20 additional security element

What is claimed, is:

1. A secure article, including a multi-page article, comprising:

a front cover;

a reverse cover; and at least one security element;

wherein the security element is provided on and/or in the front cover and/or the reverse cover, in that the security element is produced by ultrasonic welding, and in that the security element comprises or consists of an optically variable element;

in that the security element comprises at least one diffractive structure that is configured to diffract impinging electromagnetic radiation, the diffractive structure being formed by a surface of the security element and/or being a periodic structure.

2. The secure article according to claim 1, wherein the security element comprises or consists of at least one embossing and/or at least one debossing and/or at least one deformation and/or at least one melted area.

3. The secure article according to claim 1, wherein at least one of:

the security element is at least regionally fluorescent;

the security element is a diffractive element;

the security element is water-mark like.

4. The secure article according to claim 3, wherein the embossing and/or debossing and/or deformation and/or melted area at least regionally exhibits the fluorescence or generates a diffraction of impinging electromagnetic radiation or generates a water-mark like appearance.

5. The secure article according to claim 1, wherein the at least one diffractive structure comprises or consists of a plurality of slits, each slit presenting a depth or height h, said depth or height h being comprised between 0.25 μm and 1 μm, and wherein two adjacent slit present a distance d between each other, said distance d being comprised between 2 μm and 25 μm.

6. The secure article according to claim 1, wherein the front cover and/or the reverse cover comprises one or more textiles and/or one or more fabrics and/or one or more paper-based compounds and/or one or more cardboard-based compounds and/or one or more plastics and/or one or more polymers.

7. The secure article according to claim 1, wherein the front cover and/or the reverse cover comprises at least one coating element, and wherein the security element is at least partially provided in the coating element.

8. The secure article according to claim 7, wherein the coating element comprises one or more pigments and/or one or more metallic compounds including aluminium and/or one or more inks.

9. The secure article according to claim 1, wherein the security element is an integral component of the front cover and/or of the reverse cover and/or of the coating element.

10. The secure article according to claim 1, further comprising at least one additional security element being produced by ultrasonic welding, and wherein the additional security element is at least partially produced on and/or in the security element.

11. A method of producing a secure article as claimed in any one of the preceding claims, the method comprising the steps of:

providing a front cover;

providing a reverse cover; and providing at least one security element;

wherein the security element is provided on and/or in the front cover and/or the reverse cover, and in that the security element is produced by ultrasonic welding, and, in that the security element comprises or consists of an optically variable element;

further comprising the step of providing at least one sonotrode comprising at least one structure to be debossed and/or embossed into the front cover and/or the reverse cover, whereby the security element is generated, and/or further comprising the step of providing at least one anvil comprising at least one structure to be embossed and/or debossed into the front cover and/or the reverse cover, whereby the security element is generated.

12. The method according to claim 11, wherein the security element is produced before or after the front cover and the reverse cover are assembled so as to form the secure article.

13. The method according to claim 11, further comprising the steps of providing at least one coating element on the front cover and/or the reverse cover and producing the security element at least partially in the coating element, and/or further comprising the step of producing at least one additional security element by ultrasonic welding, the additional security element being at least partially produced on and/or in the security element, and wherein the security element and the additional security element are generated simultaneously and/or with a common sonotrode and/or anvil.

* * * * *